United States Patent Office 3,186,519
Patented June 1, 1965

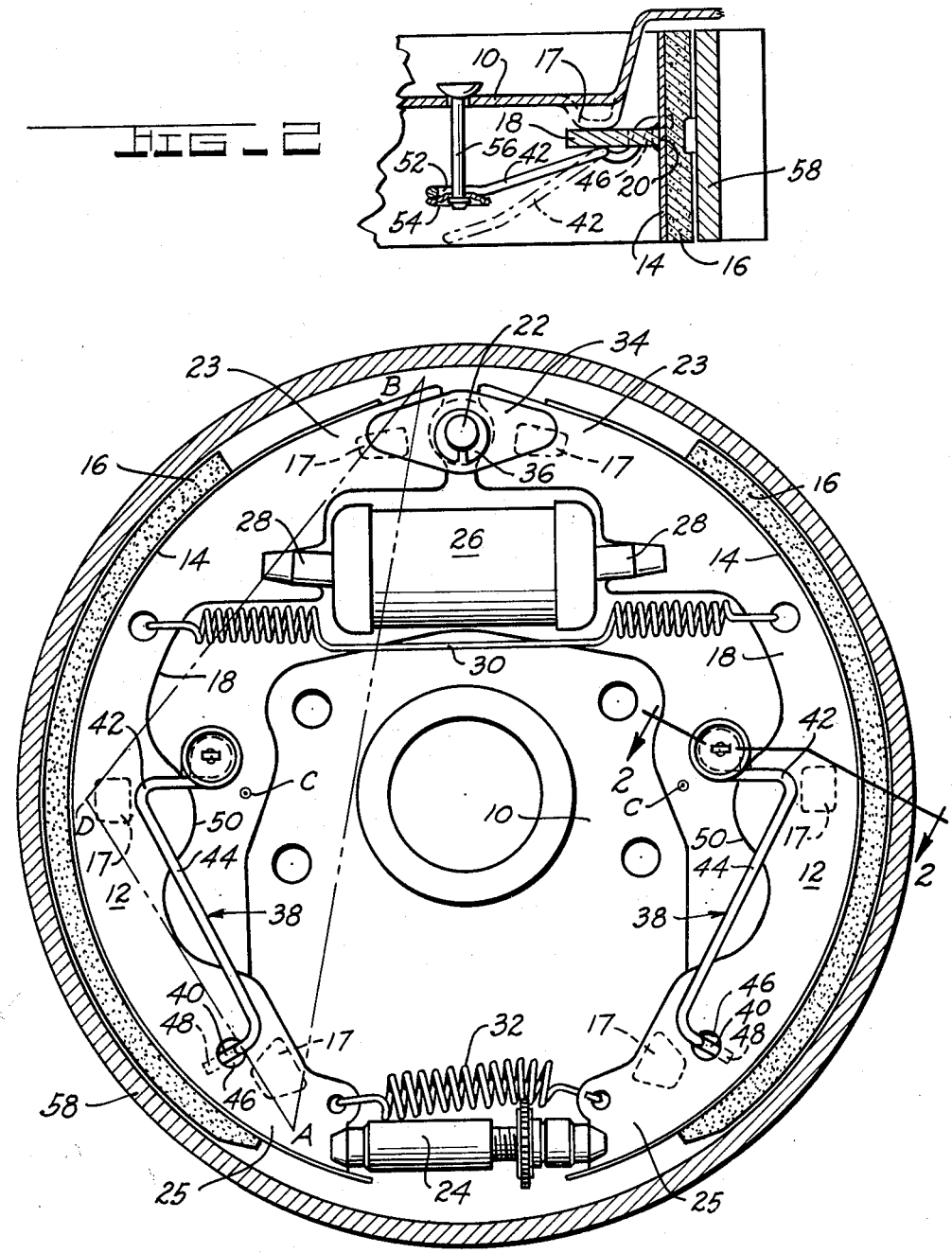

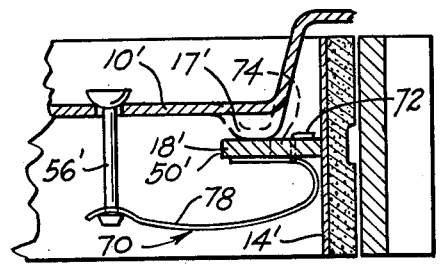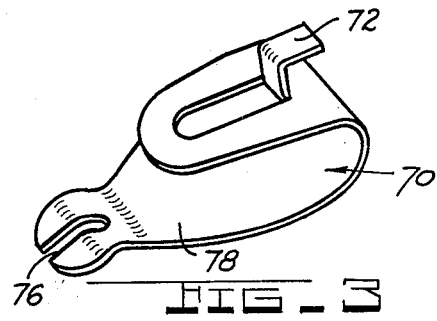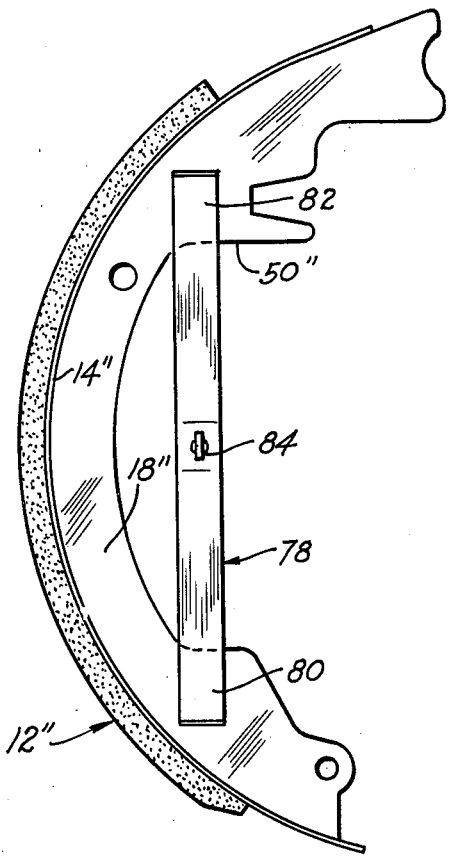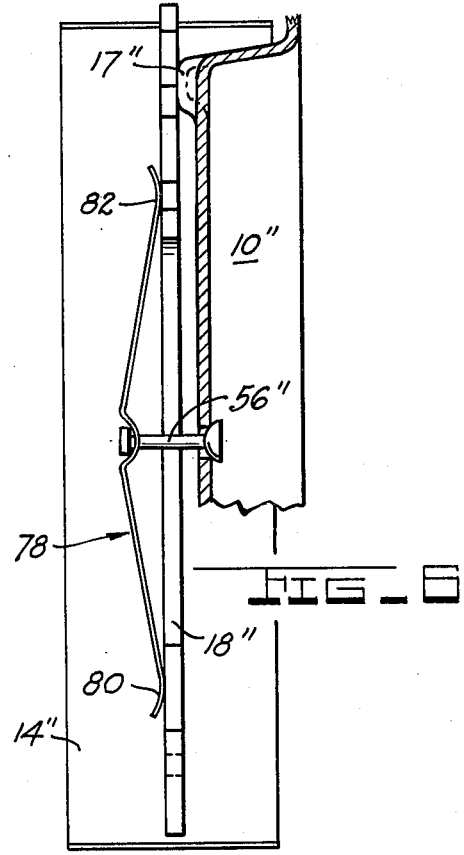
INVENTOR.
DONALD D. JOHANNESEN.
BY
Sheldon F. Raizer
ATTORNEY

3,186,519
HOLD-DOWN DEVICE
Donald D. Johannesen, South Bend, Ind., assignor to The Bendix Corporation, South Bend, Ind., a corporation of Delaware
Filed Jan. 7, 1963, Ser. No. 249,811
11 Claims. (Cl. 188—78)

This invention relates to a drum brake. More particularly, this invention relates to a hold-down device for biasing a brake shoe of the brake into engagement with a backing plate of said brake.

An object of this invention is to provide a drum brake with a hold-down device wherein the resultant of the forces exerted thereby on a brake shoe in an axial direction passes through a point between the axis of rotation of said drum and a portion of the inner edge of the brake shoe.

Another object of the invention is to provide a hold-down device for biasing a brake shoe against a backing plate which is effective and is economical to produce.

Other objects of the invention will become apparent from the following description with reference to the drawings wherein:

FIGURE 1 is a front elevational view of a brake assembly;

FIGURE 2 is a view along section line 2—2;

FIGURE 3 is an isometric view of another embodiment of a hold-down device;

FIGURE 4 is a view similar to that of FIGURE 2 only incorporating the hold-down device of FIGURE 3;

FIGURE 5 is a simplified partial front elevational view of another embodiment of a hold-down device; and FIGURE 6 is a view along section line 6—6 of FIGURE 5.

Referring to the drawing, a backing plate 10 is adapted to be attached to a fixed part of a vehicle, as for instance, an axle flange. A pair of brake shoes 12 is slidably mounted on said plate and each comprises a rim 14 with a brake lining 16 attached thereto and a transverse web 18 attached at its outer edge 20 to the rim. The shoes are supported on the backing plate by their webs which rest on pads 17. An anchor pin 22 is provided on the backing plate adjacent one pair of brake shoe ends 23 and an adjusting strut 24 interconnects the other pair of brake shoe ends 25. A fluid motor 26 is fixedly mounted to the backing plate and has a pair of links 28 providing a thrust connection between the fluid motor 26 and the brake shoes upon actuation of the brake. A shoe-to-shoe return spring 30 attached to each brake shoe web retracts the brake shoes into engagement with the anchor pin 22 and spring 32 interconnects the brake shoe ends 25 and maintains the ends 25 in engagement with the adjuster strut 24. A retainer plate 34 is secured to the anchor pin 22 by a C-clip 36 and serves to limit axial outward movement of the brake shoe ends 23.

Each shoe is provided with a cantilevered hold-down device 38 which is a wire having a main body portion 44 located between and integral with an anchoring arm 40 and an arm 42 bent in opposite directions. The arm 40 extends into an opening 46 of the web and has portion 48 bearing on the inwardly facing surface of the web. The portions of the wire member near and including the juncture of the arms 40 and 42 with the main body member 44 bear on the outwardly facing surface of the web. The arm 42 extends in a direction which is inwardly away from the inner edge 50 of the web and ends in a closed loop 52 which receives a retainer washer 54 thereon. A link or pin 56 is pivotally mounted to the backing plate 10 and is received through an opening in the washer to be retained thereby.

Referring to FIGURE 2, the arm 42 is shown dotted and in full; the former representing the unstressed condition of the arm 42 prior to connecting the pin 56 thereto, and the latter representing the normally stressed position of the arm 42. The arm 42 transfers the force exerted thereon by the pin 56 to the brake shoe web 18 around the areas of the juncture between the main body portion 44 and the arms 40 and 42 and at the area on which portion 48 of arm 40 bears against the web. The main body portion 44 is in torsion which allows the efficient use of material in the form of a wire. The path of the resultant of all the axial forces acting on the shoe by the hold-down device 38 is determined by the effective connecting point between the link 56 and the arm 42 and the effective connecting point between the link 56 and the backing plate.

The use of a hold-down device which exerts a resultant hold-down force on the brake shoe which passes as near as possible to the center of gravity of the supporting platform therefor is especially important when a return spring such as spring 30 interconnecting the shoes is used, since the force exerted on the shoes by the return spring is co-planar with the center line of the web of the shoe with no lifting effect thereon. If the hold-down load was distributed on the pads where one pad would take a much heavier load than the other pad, then it would require very small disturbing forces to lift the shoe off of the latter pad resulting in uneven lining wear, dragging, etc. Thus, the axial force exerted by the hold-down device 38 on the shoe must be spread as equally as possible to the pads 17. If the axial resultant force exerted on the brake shoe by the hold-down device passes through the center of gravity C of the supporting platform defined by the pads 17, which is also the geometrical center C of a triangle ABD formed by lines connecting the pads 17, an equal hold-down load will be exerted on each pad 17 by the shoe. Due to the backing plate configuration, it may not be possible to locate the pin 56 at the exact center of gravity C but will be offset slightly therefrom as shown in FIGURE 1.

Upon actuation of the fluid motor 26, the brake shoes 12 are spread into engagement with the brake drum 58. The pin 56 will pivot about backing plate 10 until the pin 56 binds at its connection with the backing plate. If there is a limited amount of space between the backing plate 10 and the web of the shoe 18, as for instance when the shoes are supported on the backing plate by their webs or when the shoes are supported on the backing plate by their rims and the width of the rims limits the space between the backing plate and web, a short pin 56 must be used. When a short pin is used, the pin will bind at its connection with the backing plate and will stop pivoting or tilting before the lining engages the drum. If the hold-down device 38 was fixedly secured to the web of the shoe 12, then the lining would be unable to engage the drum without damage to the pin or hold-down device 38. However, since the arm 40 of hold-down device 38 is pivotally connected to the web 18 and the main body portion 44 and arm 42 slidably bear on the web 18, relative movement will occur between the hold-down device and the shoe when the pin binds at its connection to the backing plate thus allowing the linings 16 to engage the brake drum. Obviously, as the linings wear and the shoes retract to a new adjusted position, the hold-down device will assume a different position relative to the web 18, once the pin ceases to tilt or pivot. The portions of the hold-down device 38 near and including the junctures of the arms with the main body portion 44 will always bear on the web 18 throughout wear of the linings. Obviously, if a long enough pin were used, it would not be necessary to have relative movement between the hold-down device and the web 18 although such might still be desirable.

Different embodiments of the invention are illustrated in FIGURES 3 and 4 and in FIGURES 5 and 6 and involve the same concept as the embodiment of FIGURES 1 and 2.

Referring to FIGURES 3 and 4, a curved leaf spring clip 70 has a tab 72 at one end extending through an opening 74 of the web 18′ and a slot 76 at its other cantilevered end 78 which is located between a portion of the inner edge 50′ of the web and the axis of the brake. A pin 56′ is received in the slot 76 and effects a hold-down force on the shoe through the clip 70. The clearance between the opening 74 and the tab 72 is such as to permit sliding and pivotal movement of the clip 70 relative to the web 18′ during brake application and to compensate for lining wear.

In the embodiment illustrated in FIGURES 5 and 6, a resilient plate 78 extends chordally of the brake shoe 12″ and at each end 80, 82 bears on the web 18″. A pin 56″ extends through an opening 84 located intermediate the ends of the plate and between a portion of the inner edge 50″ of said web 18″ and the axis of the brake for applying a hold-down force on the shoe 12″ through the resilient plate 78. Again relative movement between the web 18″ and the resilient plate 78 will occur upon brake actuation and to compensate for lining wear.

An inherent feature of the hold-down devices illustrated is that it requires very little space extending axially outward of the web in contrast to a conventional hold-down coil spring. This is especially advantageous when a narrow shoe is used and/or when a steel rib is used in a drum back which projects axially toward the web and beyond the edge of the rim of the shoe.

Although specific embodiments have been described, I do not wish to be limited to the particular constructions described, and it is my intention to cover hereby all novel adaptations, modifications and arrangements thereof which come within the practice of those skilled in the art to which the invention relates.

I claim:

1. In a drum brake: a drum rotatable about an axis; a support member; a brake shoe slidably supported by said support member for engagement with said drum and comprising a rim with friction material attached thereto and a web transverse to said rim and attached at its outer edge to said rim; a cantilevered hold-down device anchored at one end on said shoe and having a portion thereof axially spaced from the plane of said web in a direction away from said support member; means developing force on said hold-down device in a direction toward said support member; said means being operatively connected to said support member and to said portion of said hold-down device and so located that the net resultant force, in a direction toward said support member, exerted on said brake shoe by said hold-down device passes between a portion of the inner edge of said web and said axis.

2. The structure as recited in claim 1 wherein said means is a rigid member connected at one end to said support member and at the other end to said hold-down device.

3. In a drum brake: a drum rotatable about an axis, a support member, a brake shoe slidably supported by said support member for engagement with said drum and comprising a rim with friction material attached thereto and a web transverse to said rim and attached at its outer edge to said rim, a cantilevered hold-down device anchored at one end on said shoe and having a portion thereof axially spaced from the plane of said web in a direction away from said support member, a rigid member operatively connected to said portion of said hold-down device and operatively connected to said support member, said rigid member passing between said axis and a portion of the inner edge of said web, said rigid member effecting a force on said hold-down device thereby exerting a force on said shoe in a direction toward said support member.

4. In a drum brake: a drum rotatable about an axis, a support member, a brake shoe slidably supported by said support member for engagement with said drum and comprising a rim with friction material attached thereto and a web transverse to said rim and attached at its outer edge to said rim, a hold-down device comprising a leaf spring pivotally and slidably mounted at one end on said web and curved toward said rim and then extending in a direction away therefrom and terminating at the other end at a location axially spaced from the plane of said web in a direction away from said support member, a rigid member operatively connected to said other end of said leaf spring and operatively connected to said support member, said rigid member passing between said axis and a portion of the inner edge of said web, said rigid member effecting a force on said leaf spring thereby exerting a force on said shoe in a direction toward said support member.

5. In a drum brake: a drum rotatable about an axis, a support member, a brake shoe slidably supported by said support member for engagement with said drum and comprising a rim with friction material attached thereto and a web transverse to said rim and attached at its outer edge to said rim, a cantilevered hold-down device comprising a resilient wire member pivotally and slidably anchored at one end on said web and having its other end extending away from said rim and terminating at a location axially spaced from the plane of said web and in a direction away from said support member, and means operatively connected to said other end of said wire member and operatively connected to said support member for stressing said wire member and arranged to exert a force on said shoe the net resultant of which is in a direction toward said support member and passing between a portion of the inner edge of said web and said axis.

6. In a drum brake: a drum rotatable about an axis, a support member, a brake shoe slidably mounted on said support member for engagement with said drum and comprising a rim with friction material attached thereto and a web transverse to said rim and attached at its outer edge to said rim, a cantilevered resilient member pivotally attached at one end to the web of said shoe, the other end of said resilient member being axially spaced from the plane of said web and in a direction away from said support member, and means operatively connected to said other end of said resilient member and to said support member for stressing said resilient member and arranged to exert a force on said shoe the net resultant of which is in a direction toward said support member and passing between a portion of the inner edge of said web and said axis.

7. The structure as recited in claim 6 wherein said connecting means comprises a rigid member attached at one end to said resilient member and pivotally attached at its other end to said support member.

8. The structure as recited in claim 7 wherein: said resilient member comprises a member having a main body portion located between arms which are bent away from said body portion, one of said arms has a pivotal connection with said web and is held against axial movement by said web and the other arm extends inwardly away from a portion of said rim and is connected to said one end of said rigid member, and at least a part of said main body portion slidably engages the surface of said web which faces away from said support member.

9. In a drum brake: a drum rotatable about an axis, a support member, a brake shoe slidably mounted on said support member for engagement with said drum and comprising a rim with friction material attached thereto and a web transverse to said rim and attached at its outer edge to said rim, a resilient wire member comprising a main body having an arm bent from each end thereof, an opening in the web of one of said shoes, one of said arms extending through said opening engaging said web and providing a pivotal connection between said wire member and said web, the other arm ending at a location axially spaced from the plane of said web in a direction away from said support member, at least a portion of said main body engaging the surface of said web facing away from said support member, a rigid member pivotally connected at one end to said support member and connected at its other end to the free end of said other arm to stress said wire member and thereby exert a force on said shoe in a direction toward said support member.

10. The structure as recited in claim 3 wherein: said hold-down device comprises a resilient member having an elongated main body portion located between arms which are bent away from said body portion, one of said arms has a pivotal connection with said web and is held against axial movement by said web and the other arm extends inwardly away from a portion of said rim and is connected to said rigid member, and at least a part of said main body portion slidably engages the surface of said web which faces away from said support member.

11. In a drum brake: a drum rotatable about an axis, a support member, a brake shoe slidably mounted on said support member for engagement with said drum and comprising a rim with friction material attached thereto and a web transverse to said rim and attached at its outer edge to said rim, a cantilevered resilient member comprising a main body portion slidably engaging the surface of the web which faces away from said support member, one end of said main body portion being pivotally connected to and held against axial movement by said web, an arm at the other end of said main body portion bent away therefrom in a direction which is transverse to said main body portion and away from said support member, said arm terminating at a location which is axially spaced from the plane of said web, a rigid member operatively connected to said arm and operatively connected to said support member for stressing said resilient member and thereby exert a force on said shoe in a direction toward said support member.

References Cited by the Examiner
UNITED STATES PATENTS

| 2,740,498 | 4/56 | Trahern | 188—78 |
| 2,745,516 | 5/56 | Smith | 188—78 |
| 2,999,566 | 9/61 | Naudzius | 188—78 |

FOREIGN PATENTS

| 1,109,268 | 9/55 | France. |

EUGENE G. BOTZ, *Primary Examiner.*

RALPH D. BLAKESLEE, DUANE REGER,
*Examiners.*